United States Patent [19]

Tagou

[11] Patent Number: 5,659,962
[45] Date of Patent: Aug. 26, 1997

[54] PEELING DEVICE

[76] Inventor: Mitiaki Tagou, 510, Ooaza Imai, Soni-son, Uda-gun, Nara-ken, Japan

[21] Appl. No.: 524,207

[22] Filed: Sep. 8, 1995

[30] Foreign Application Priority Data

Sep. 20, 1994 [JP] Japan .................. 6-224648
Apr. 18, 1995 [JP] Japan .................. 7-092675

[51] Int. Cl.[6] ........................................ B26B 3/00
[52] U.S. Cl. ........................ 30/279.6; 30/298; 30/123.5
[58] Field of Search .................... 30/279.6, 296.1, 30/298, 123.5

[56] References Cited

U.S. PATENT DOCUMENTS

| | | | |
|---|---|---|---|
| 825,073 | 7/1906 | Reed | 30/298 |
| 1,367,876 | 2/1921 | Heffner | 30/279.6 |
| 1,444,976 | 2/1923 | Mandley | 30/298 |
| 1,506,928 | 9/1924 | Hansen et al. | 30/298 |
| 2,781,760 | 2/1957 | Baer | 30/298 |
| 4,630,367 | 12/1986 | Pressman et al. | 30/279.6 |

*Primary Examiner*—Hwei-Siu Payer
*Attorney, Agent, or Firm*—Koda and Androlia

[57] ABSTRACT

The peeling device includes a base body and a peeling blade. The base body has a thumb fitting part designed to fit with a palm side of a user's thumb and a holding part with which the device is held on the thumb. The thumb fitting part and the holding part are integrally formed of plastic. The peeling blade is provided on the base body. The fitting part may have a pressing part connecting with the base body, which stands along with a side of the thumb in use. The holding part includes flexible wires projecting from a tip side and a root side on one side of the base body and having counter flexible wires on the other side. The peeling blade has a cutting edge and a slip-out hole.

6 Claims, 5 Drawing Sheets

PEELING DEVICE

BACKGROUND OF THE INVENTION

The present invention relates to a device for easily peeling potatoes, fruit and the like.

A conventional peeler or pater has a handle and a peeling blade which extends in the longitudinal direction of the handle or intersects with the handle. In order to peel a potato or fruit, a user must hold this conventional peeler in one hand, and a potato or fruit to be peeled in the other hand.

The peeler as stated above, however, is used with being held by the handle by a user's hand. Even if the user holds a part of the handle which is very near to the peeling blade, there must be some distance between the blade and the user's thumb and fingers. This makes it difficult to adjust force on the peeler. So it is difficult to peel undulated or uneven portions of potatoes or fruit and it is not easy to peel potatoes or fruit neatly with such a peeler.

Furthermore, with difficulty in adjusting force on the peeler, users are prone to cut a thumb or a finger of a hand holding a potato or fruit inadvertently.

OBJECTS AND SUMMARY OF THE INVENTION

Accordingly, it is an object of the present invention to provide a peeling device which overcomes the drawbacks of the prior art.

It is another object of the present invention to provide a peeling device with which peeling of uneven portion can be easily obtained.

It is furthermore another object of the present invention to provide a peeling device which enables safe peeling with less possibility of cutting a thumb or a finger by mistake.

For the above purpose, a peeling device of the present invention includes a base body and a peeling blade. The base body includes a thumb fitting part designed to fit with a palm side of a thumb and a holding part with which the device is held on the thumb.

The fitting part may include a connecting pressing part which is located along with a side of the thumb in use.

The holding part may include flexible wire parts which project from a tip side and a root side on each side of the base body and confront each other.

The peeling blade may include a cutting edge with a scooping edge.

Furthermore the base body may be formed integrally.

In use of the peeling device of the present invention, the peeling blade is located very near to a thumb of a user. Therefore, the user easily adjusts force on the device and easy and neat peeling is obtained.

In a peeling device in which the thumb fitting part has a connecting pressing part to be located along with a side of the user's thumb in use, the user can put the side of his or her thumb on the pressing part and press it to apply a bigger force thereon. This allows easy peeling.

In a peeling device with flexible wire parts on the fitting part, the size can be adjusted to fit with a user's thumb.

In addition, the scooping edge on the peeling blade allows to easily take off such as an eye of a potato or a core of an apple.

DETAILED DESCRIPTION OF THE PREFERRED EMBODIMENTS

Embodiments of a peeling device of the present invention are shown in FIGS. 1 to 7. The device includes a base body 1 and a peeling blade 4. The base body 1 includes a thumb fitting part 2 designed to fit with a palm side of a user's thumb and a holding part 3 with which the device is kept on the thumb.

Figure 1:
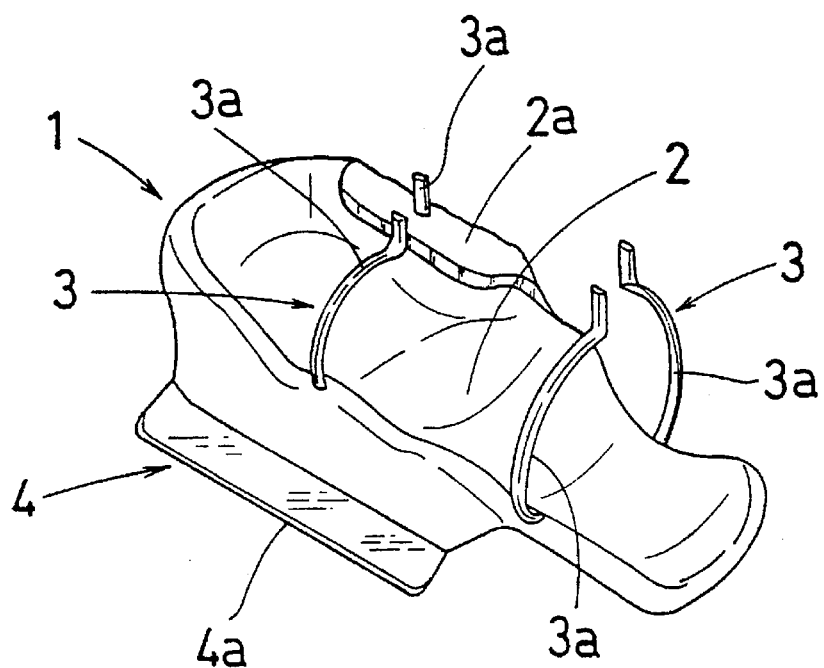
FIG. 1 is a perspective view of a first embodiment of a peeling device of the present invention.
Figure 2:
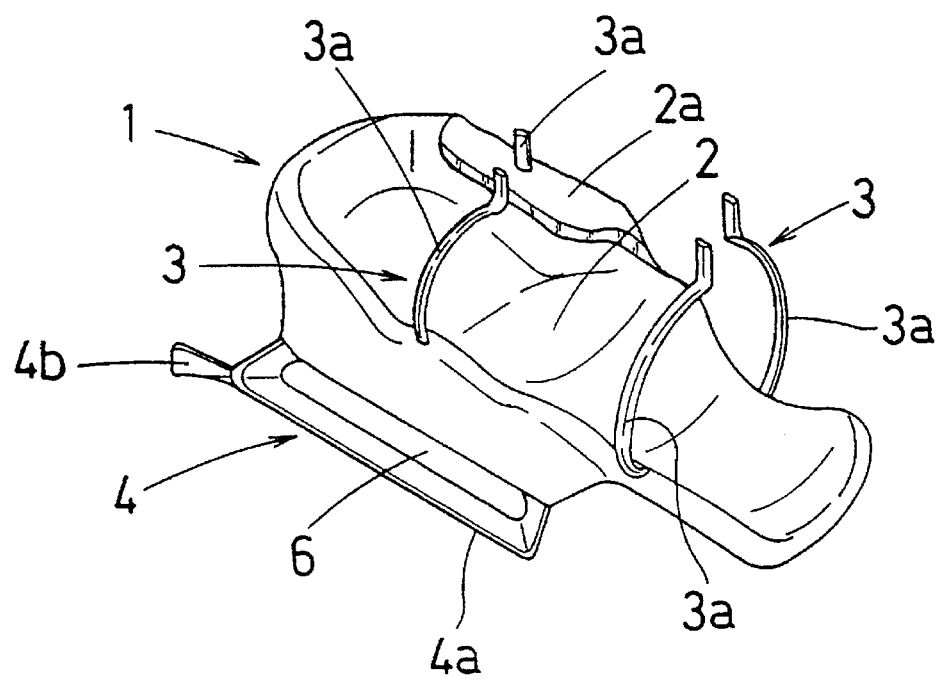
FIG. 2 is a perspective view of a second embodiment of a peeling device of the present invention.

FIGS. 1 and 2 illustrate respectively a first and a second embodiment of the present invention. Here in the peeling device, the thumb fitting part 2 is formed on a main base of plastics in a size approximately the same as a thumb. The holding part 3 and the peeling blade 4 are also formed on the main base. These three parts are simultaneously formed on the main base into an integral single body.

In order that the device fits with a thumb of a user, the thumb fitting part 2 may have an abutting part 2b against which a tip of the user's thumb abuts, a hollowed portion corresponding to a thumb pad, a swollen portion corresponding to a knuckle portion of the thumb, and a dented portion corresponding to a root portion thereof. The fitting part 2 furthermore may possess a pressing portion 2a connecting to the main base which stands along with a side of the thumb in use. It is preferable to plant the holding part 3 on the hollowed portion and the dented portion.

The holding part 3 may be formed in various manners, such as in a manner that a thumb is to be inserted therein. In the first and the second embodiment of the present invention, as shown in FIGS. 1 and 2, two flexible wires 3a, 3a project from a tip side and a root side on one side of the fitting part 2 and each of them 3a, 3a has its counter flexible wire 3a, 3a on the other side of the fitting part 2. Adjustment with pressing them to widen or narrow preferably provides the size suitable for a user's thumb.

Figure 3:
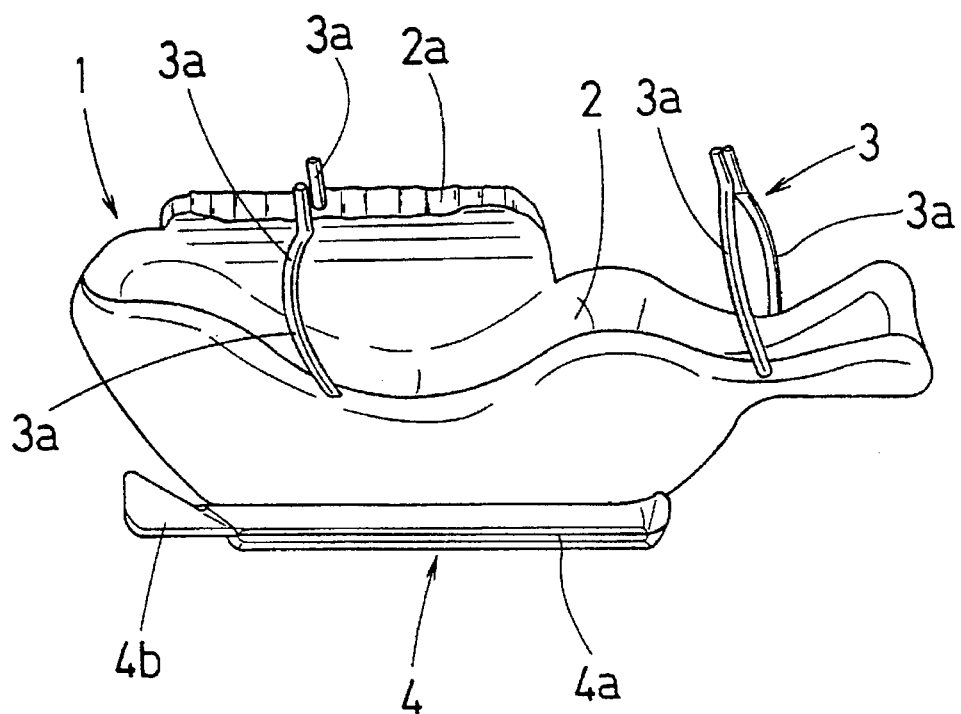
FIG. 3 is a side view of the second embodiment of the peeling device of the present invention.

The peeling blade 4 is provided longitudinally along with the base body 1. In FIG. 1, the blade 4 having a cutting edge 4a is formed in a spatulate shape. Alternatively as shown in FIG. 2, it may include a slip-out hole 6 thereon. The blade 4 with the slip-out hole 6 has a cutting edge on an inner edge defining the slip-out hole 6 and an angled portion 4c on an outer edge of the peeling blade 4. In addition, as shown in FIGS. 2 and 3, a scooping edge 4b may be provided on the peeling blade 4. This scooping edge 4b facilitates taking off such as an eye of a potato or a core of an apple.

Figure 4:
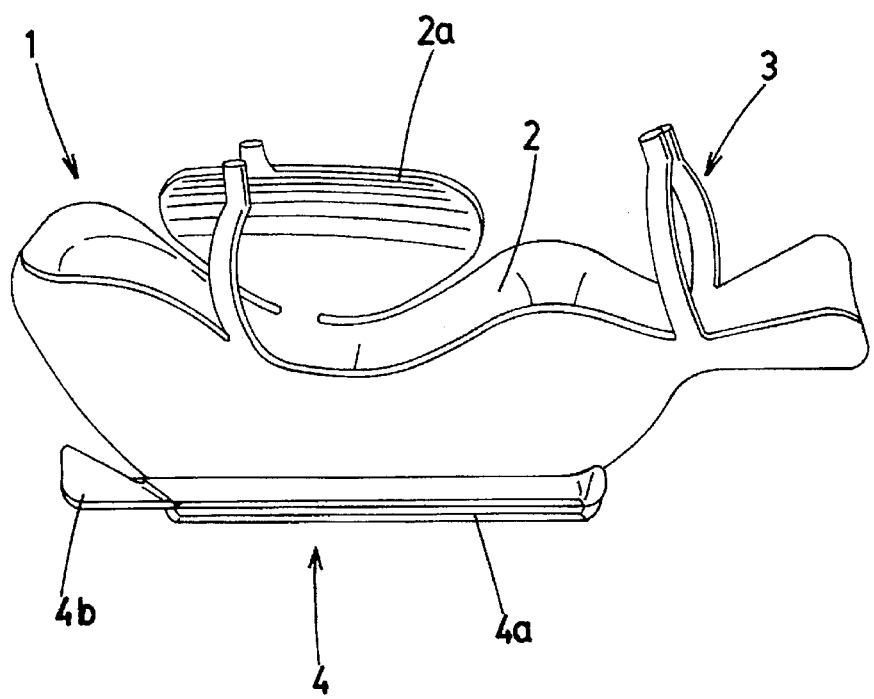
FIG. 4 is a side view of a third embodiment of a peeling device of the present invention.
Figure 5:
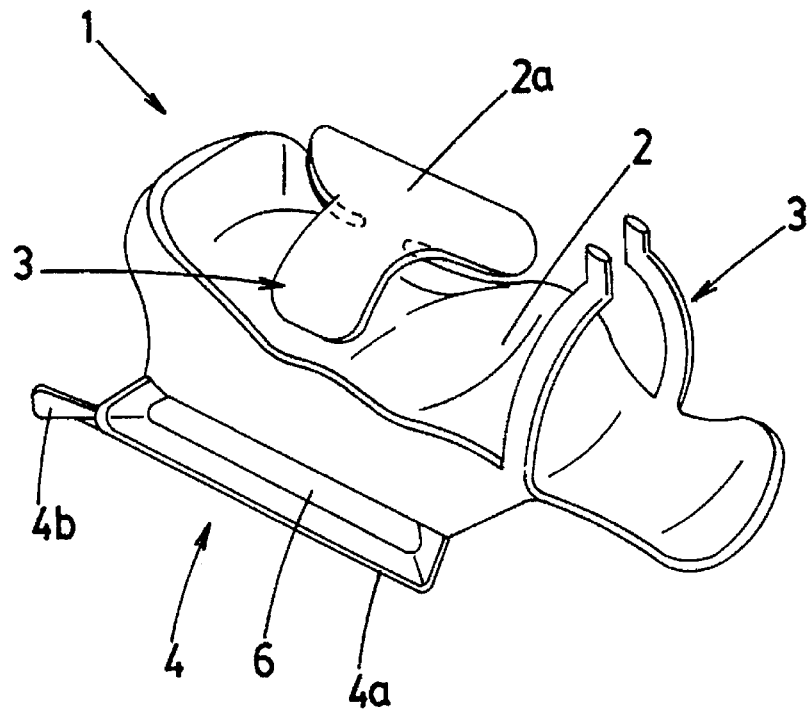
FIG. 5 is a perspective view of a fourth embodiment of a peeling device of the present invention.

The peeling device of a third emboaiment of the present invention is shown in FIG. 4. In this embodiment, a base body 1 having a thumb fitting part 2 and a holding part 3 is made of metal and formed integrally. A peeling blade 4 is provided on the base body 1 by spot welding after the base body being formed integrally. In order to give a soft touch to a user's thumb, it is preferable to add soft material such as sponge inside of the base body 1. In a fourth embodiment as shown in FIG. 5, at the tip side of base body there is only one fitting part which spreads longer and wider enough than a wire part.

Figure 6:
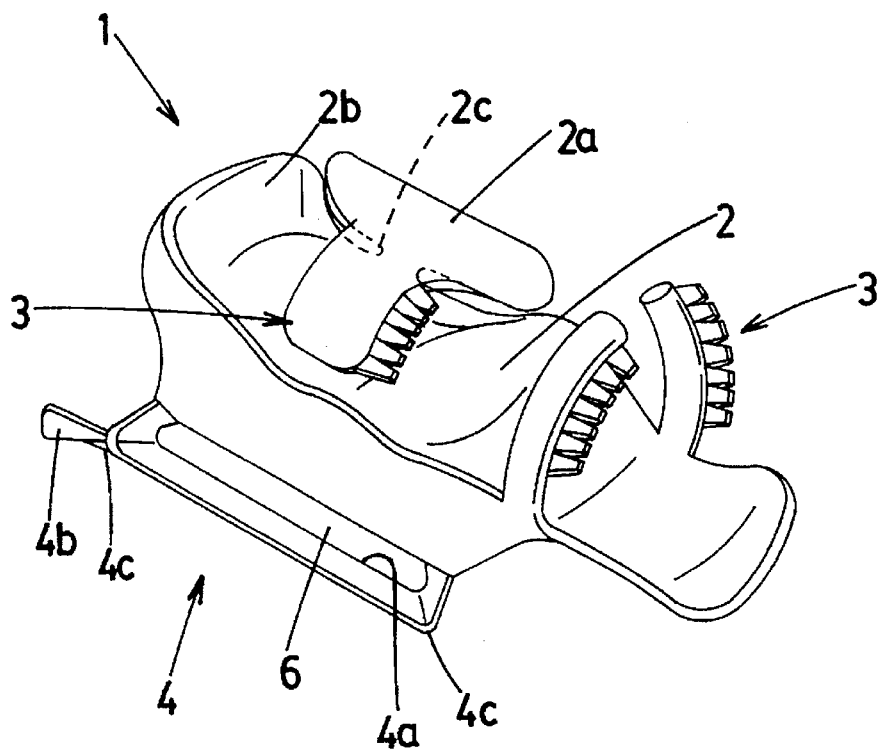
FIG. 6 is a perspective view of a fifth embodiment of a peeling device of the present invention.
Figure 7:
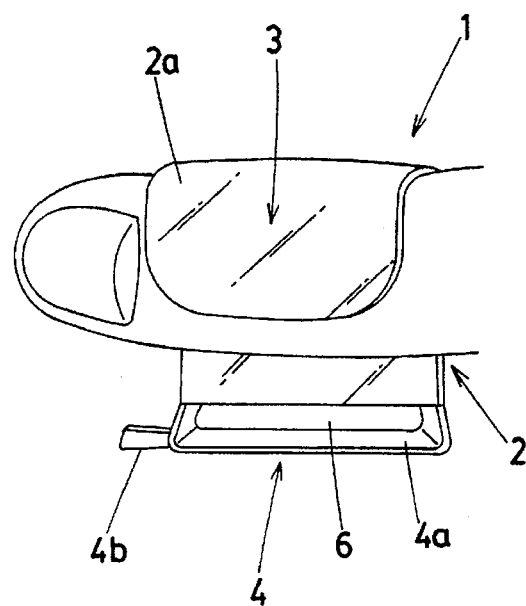
FIG. 7 is a perspective view of a sixth embodiment of a peeling device of the present invention.

FIGS. 6 and 7 respectively illustrate a fifth and a sixth embodiment of the present invention. Here a base body 1 made of plastic is formed integrally. It is suitable that plastic can be deformable and remain in a deformed shape, such as plastic used for guitar picks. The peeling blade 4 is provided at the time of plastic forming process or after that.

The fifth embodiment in FIG. 6 has holding parts 3 which have plural cuts on the root sides. The cuts allow the root sides of the holding parts 3 to spread or widen. As a result, the device fits with a user's thumb more suitably. Providing a narrowed part 2c as a connecting part between the pressing part 2a and the thumb fitting part 2 allows a larger flexibility and easy fitting on a thumb.

The sixth embodiment in FIG. 7 has a base body 1 of a plastic sheet. This plastic sheet is bent so as to fit with a user's thumb and respective appropriate portions serve as a thumb fitting part 2, a pressing part 2a, and a holding part 3. This device is used to be put around a user's thumb.

Alternatively, the bare body, of the third and the fourth embodiment in FIGS. 4 and 5 may be made of plastic, while that of the fifth and the sixth embodiment in FIGS. 6 and 7 are of metal, integrally.

Figure 8:
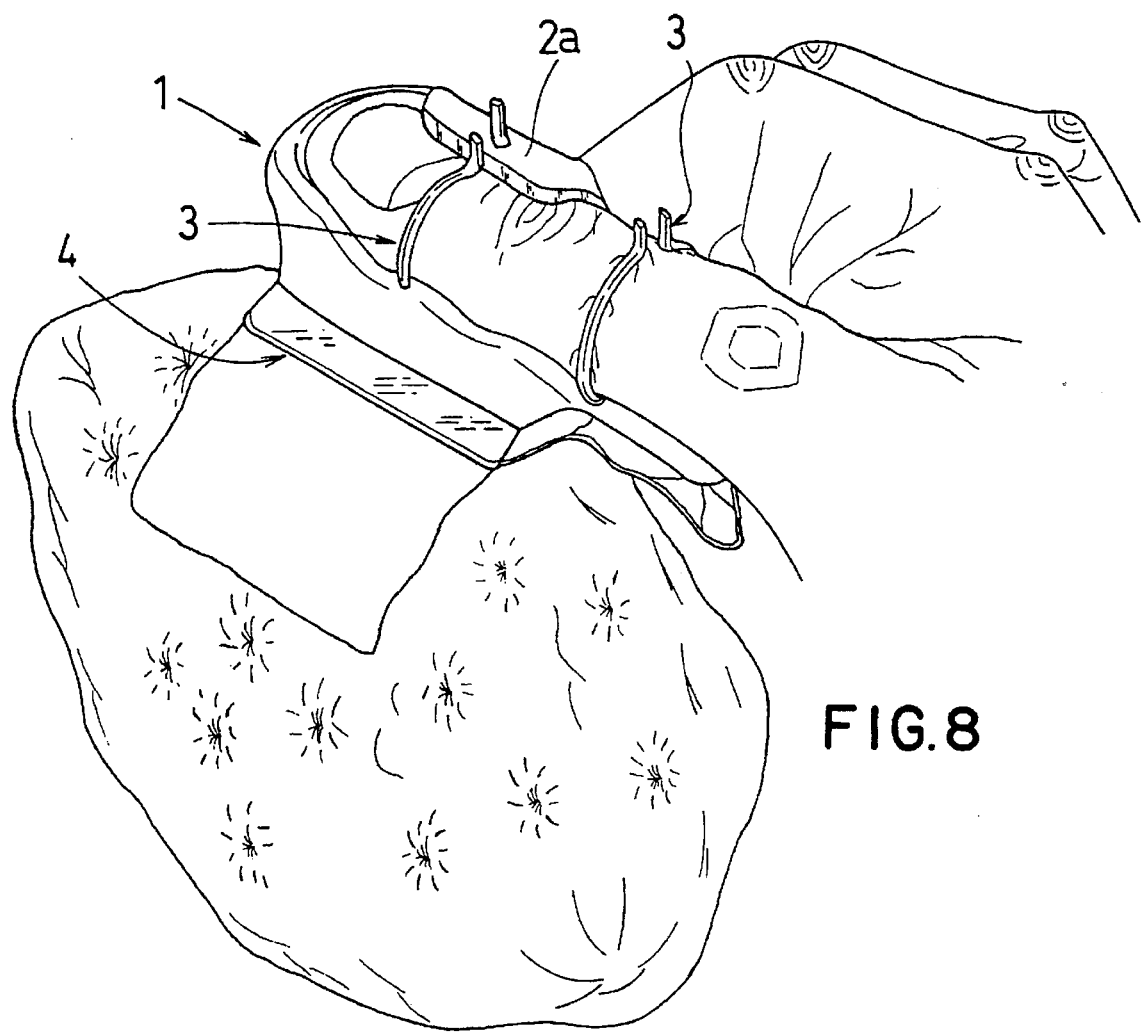
FIG. 8 is a perspective view showing the peeling device of the first embodiment in use.
Figure 9:
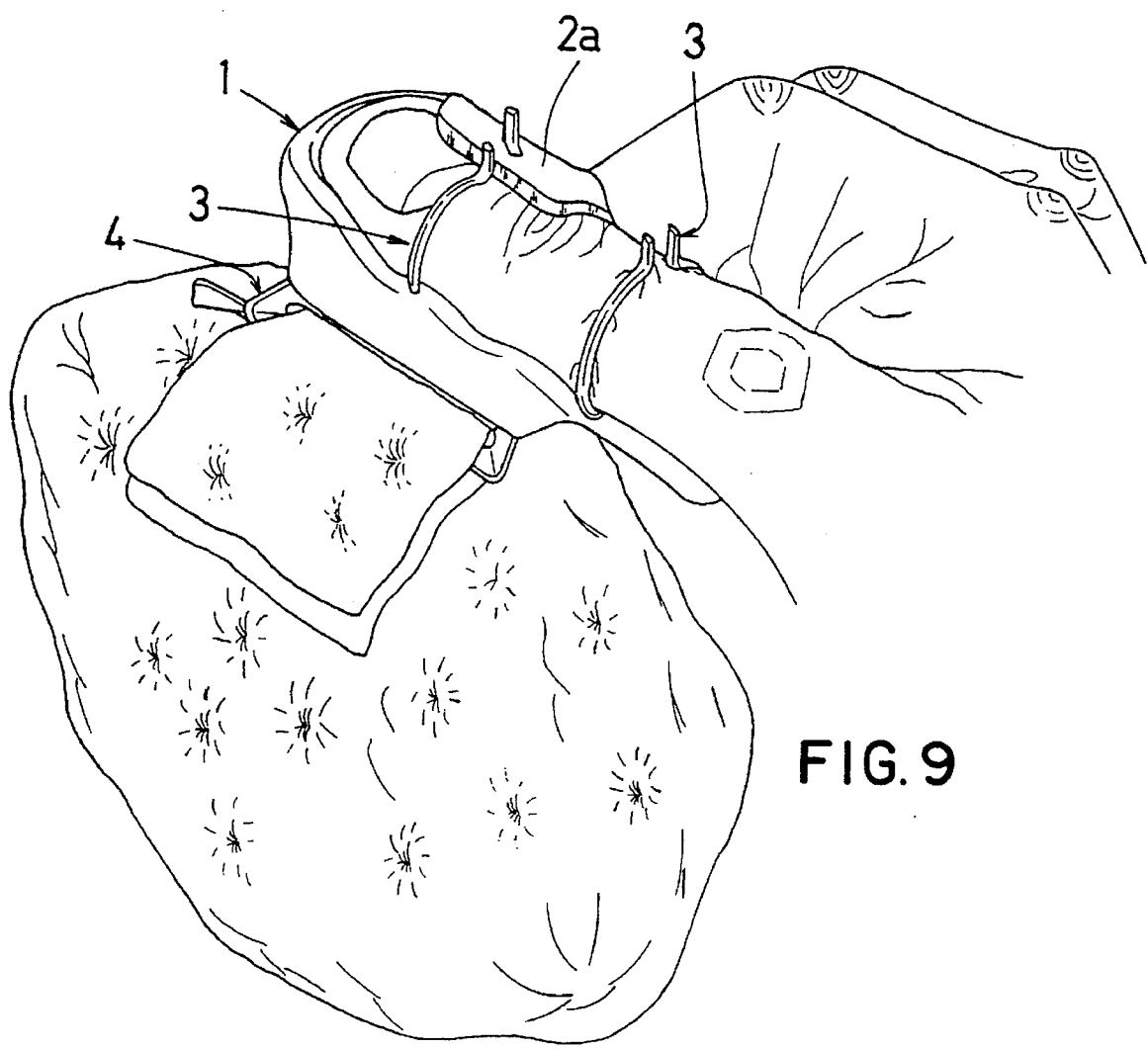
FIG. 9 is a perspective view showing the peeling device of the second embodiment in use.

In use of the peeling device as stated above, a user puts a palm side of his or her thumb of one hand to the thumb fitting part 2 and presses and bents the holding parts 3 to adjust to fit with the thumb. In the first and the second embodiment, the user bends the holding wires 3a to widen or narrow the gap between the wires 3a to adjust to the thumb. In this status, as whown in FIGS. 8 and 9, keeping the peeling device on the thumb on one hand, the user can hold a potato or fruit in the other hand and peel it. In FIG. 8, the peeling device is used in a manner that the user draws his or her thumb with the peeling device on it towards his or her index finger and performs the peeling with the cutting edge 4a. When removing an eye of a potato or the like, with the peeling device on the thumb and without unnaturally bending the thumb, the user can use the angled part 4c or the scooping edge 4b and easily take if off.

Since the peeling device of the present invention is constituted as above stated, in use of this device, the peeling blade 4 is located near to a user's thumb. This allows easy and neat peeling job.

Also with the peeling device of the present invention, it is easy to adjust force thereon. Therefore, it facilitates easy peeling and prevents inadvertent cutting a thumb or a finger of a hand holding a potato or fruit.

What is claimed is:

1. A peeling device comprising:

a base body (1) having a timrob fitting means (2) for fitting a palm side of a user's thumb and holding means (3) with which the device is held on the thumb, the base body (1) being integrally formed of plastic;

a peeling blade (4) provided on the base body (1); and said thumb fitting means (2) having on one longitudinal side thereof a pressing part (2a) connecting from said base body (1) against which a side of the user's thumb abuts in use and on the other longitudinal side thereof said peeling blade (4) having a cutting edge thereof (4a) on an inner edge defining a slip-out hole (6) and an angular pin (4c) on an outer edge thereof.

2. A peeling device according to claim 1, wherein the holding means (3) include flexible wires (3a) projecting from a tip side and a root side on one longitudinal side of the base body (1) and having respective counter flexible wires (3a) on the other longitudinal side of the base body (1).

3. A peeling device according to claim 1, wherein the peeling blade (4) has a scoooping edge (4b).

4. A peeling device according to claim 1, wherien said thumb fitting means (2) has an abutting part (2b) against which a tip of the user's thumb abuts and a configuration corresponding to a shape of the palm side of the user's thumb, a part receiving a thumb pad of the thumb is hollowed, a part receiving a knuckle part of the thumb is swollen, and a part receiving a root part of the thumb is dented.

5. A peeling device according to claim 4, wherein said holding means (3) are planted on the hollowed and the dented parts on said thumb fitting means (2).

6. A peeling device according to claim 1, wherein holding means (3) have plural cuts on root sides thereof.

* * * * *

UNITED STATES PATENT AND TRADEMARK OFFICE
CERTIFICATE OF CORRECTION

PATENT NO.    :  5,659,962
DATED         :  August 26, 1997
INVENTOR(S)   :  Mitiaki Tagou It is certified that error appears in the above-indentified patent and that said Letters Patent is hereby corrected as shown below:

In Column 3, Line 26:   Change "the bare body" to --the base body 1--;

In Column 4, Line 13:   Change "timrob" to --thumb--;

In Column 4, Line 22:   Delete "thereof";

In Column 4, Line 23:   Add --thereof-- in between "edge" and "defining";

In Column 4, Line 24:   Change "pin" to --part--; and

In Column 4, Line 31:   Change "scoooping" to --scooping--

Signed and Sealed this

Third Day of March, 1998

Attest:

BRUCE LEHMAN

*Attesting Officer*     Commissioner of Patents and Trademarks